Figure 14:
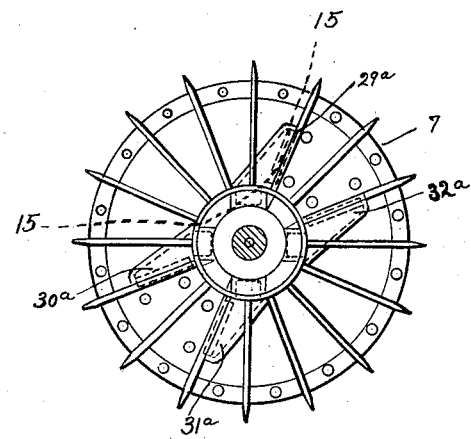

Jan. 5, 1932.  L. SWENINGSON  1,839,275
ROTARY INTERNAL COMBUSTION ENGINE
Filed Aug. 24, 1926   4 Sheets-Sheet 1
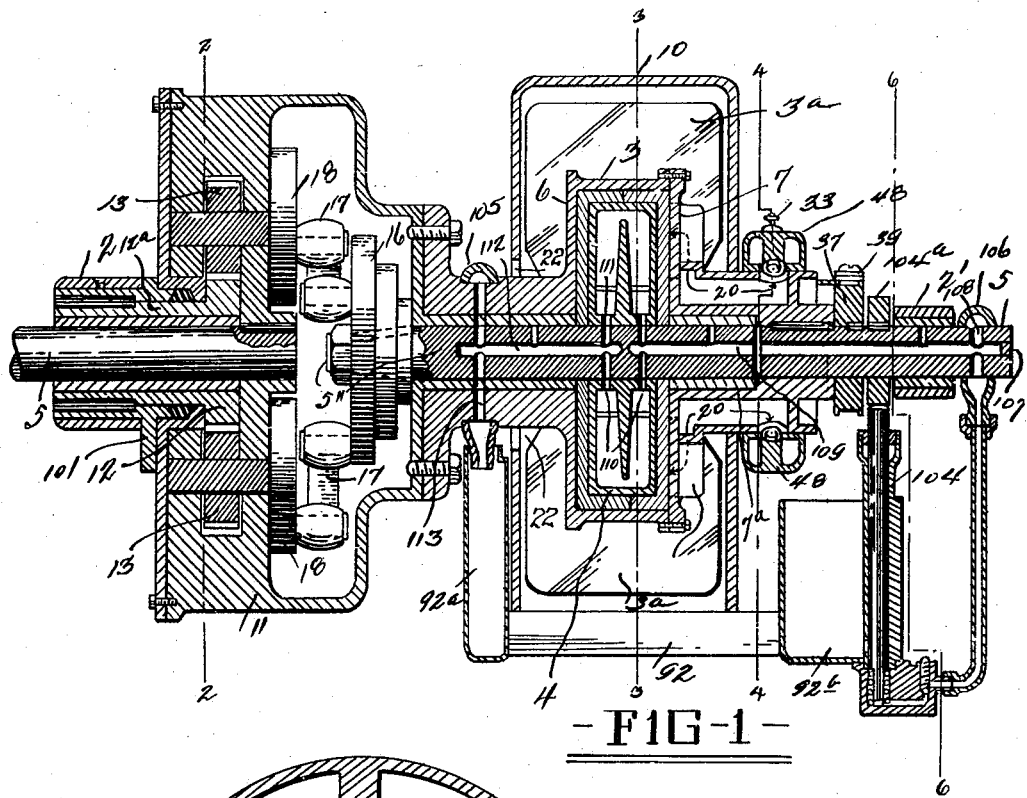
- FIG-1 -
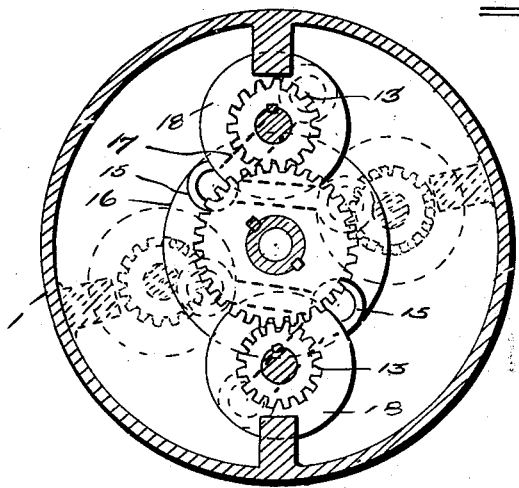
- FIG-2 -
INVENTOR.
Louis Sweningson
BY
John A. Bonnhardt
ATTORNEY.

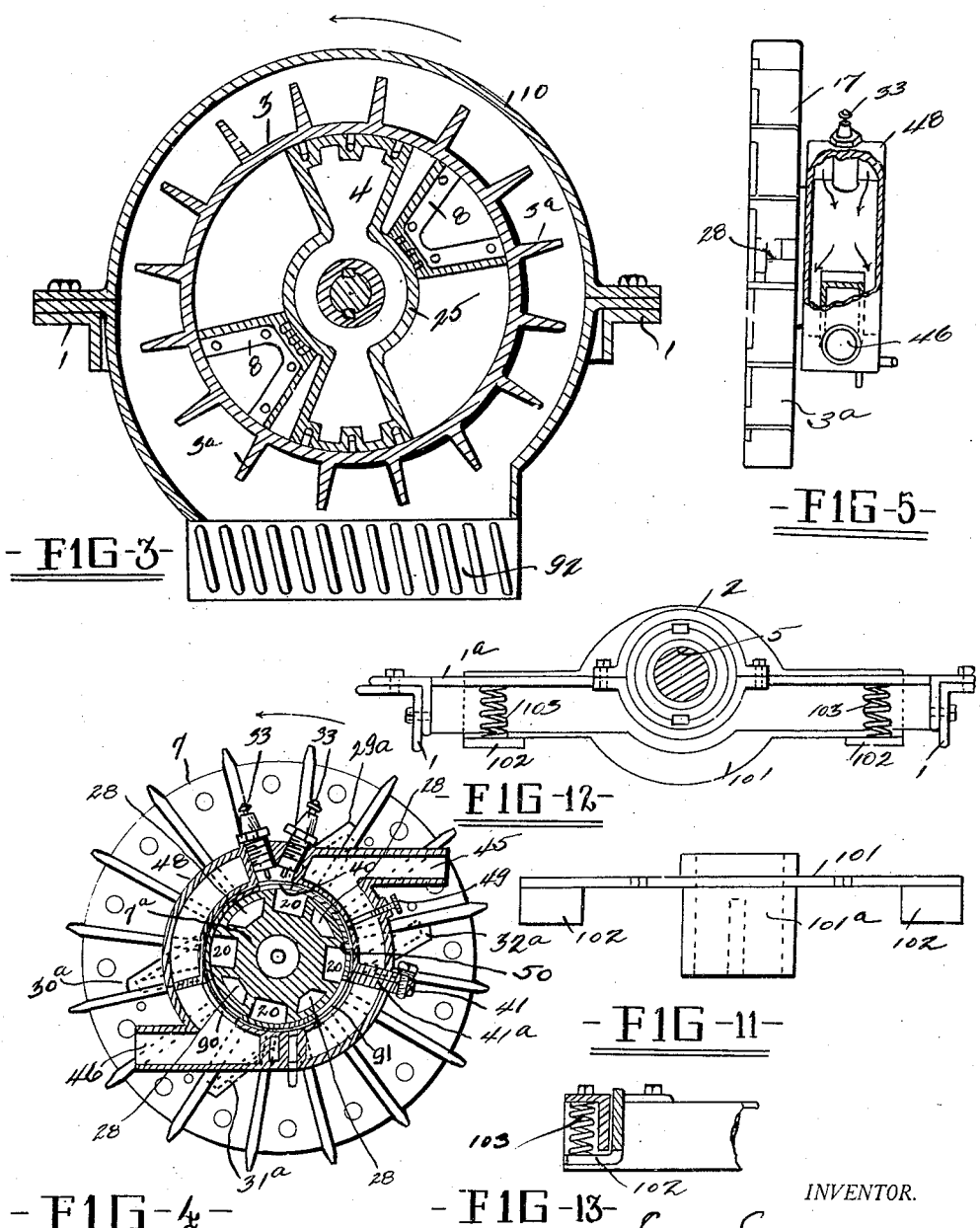

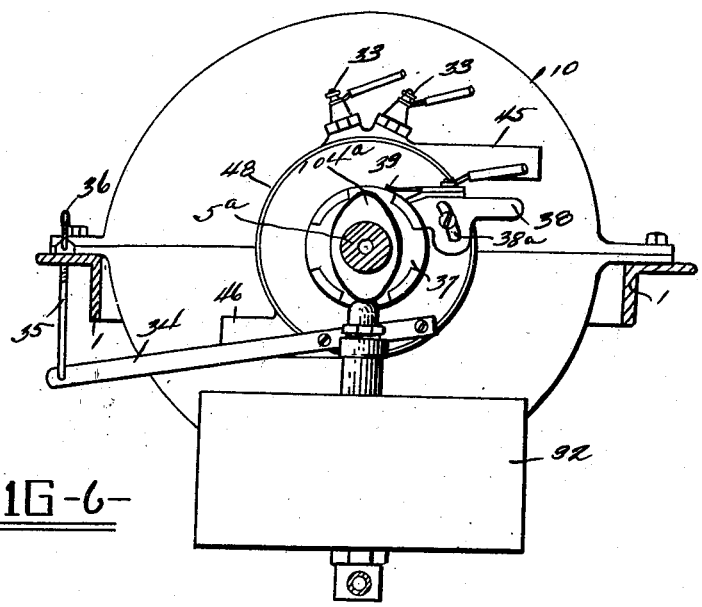
FIG-6-
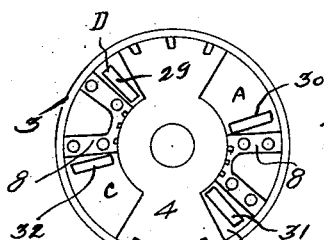
FIG-7-
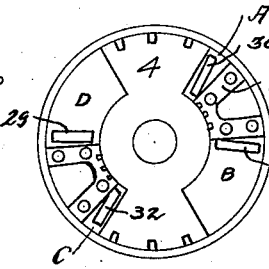
FIG-8-
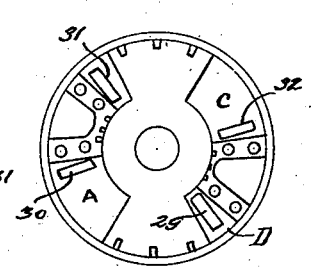
FIG-9-
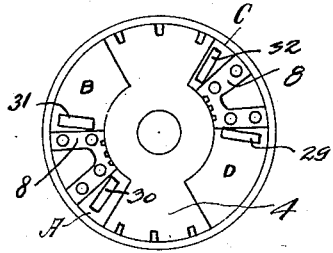
FIG-10-

Jan. 5, 1932.  L. SWENINGSON  1,839,275
ROTARY INTERNAL COMBUSTION ENGINE
Filed Aug. 24, 1926    4 Sheets-Sheet 4

INVENTOR.
Louis Sweningson
BY
John A. Bommhardt
ATTORNEY.

Patented Jan. 5, 1932

1,839,275

UNITED STATES PATENT OFFICE

LOUIS SWENINGSON, OF EAST CLEVELAND, OHIO, ASSIGNOR, BY DIRECT AND MESNE ASSIGNMENTS, TO THE S. F. P. ENGINE CO., OF CLEVELAND, OHIO, A CORPORATION OF OHIO

ROTARY INTERNAL COMBUSTION ENGINE

Application filed August 24, 1926. Serial No. 131,214.

This invention relates to rotary internal combustion engines of the type shown in the patent to Woodward No. 1,353,205 on which the present invention is an improvement. The manner of operation of the engine is disclosed in said patent to which reference may be made as to any features not specifically described in the following specification.

One object of the present improvement is to create greater efficiency, omit parts, and provide a lower manufacturing cost. A further object is to utilize the revolving ribbed cylinder of the engine as a blower encased and discharging upon a radiator, thereby cooling the revolving cylinder as well as fluid contained in a radiator and which circulates thru the main shaft of the engine and the interior of the piston and is discharged at one end of the radiator into the pump.

Another object of the invention relates to the number and position of the spark plugs, with a provision for multiple ignition, as well as novel means for cooling the plugs and the manifold as well as preheating the charge.

Another object relates to the timing mechanism comprising a commutator carried by the shaft of the engine.

A further improvement relates to the control and operation of the intake and exhaust ports including an adjustable manifold varying the intake and exhaust port openings to the best of advantage as well as advancing or retarding the time of ignition. The timing device in combination with a movable intake and exhaust manifold provide means whereby the advance or retarding of the spark may be controlled to the best advantage.

A further object of the invention is to provide simple means for diminishing or releasing the compression of the charge in the engine while in operation or in starting, without loss of fuel, by releasing a part or all of the compressed charge back into the intake manifold from which it may be taken into the following explosion chamber. This is especially desirable in an engine for air craft purposes, being able to maintain nearer normal combustion of the charge at high or low altitudes.

A further object of the invention is to provide means of adjustment in a movable combination intake and exhaust manifold, to compensate for wear or variation in expansion of the manifold and a projecting revolving port hub on which it rides and is supported. This hub is a part of the cylinder head, having ports communicating with ports in the manifold. The manifold has a circular liner for convenience of removal or replacement when worn and to provide a more suitable bearing material than that which may be used in the manifold itself.

Other improvements and advantages will be apparent from the following description and the accompanying drawings, in which Fig. 1 is a longitudinal section of the engine. Fig. 2 is a cross-section on line 2—2 of Fig. 1. Fig. 3 is a section on line 3—3 of Fig. 1, showing an eccentric air casing or housing with an inlet leading to the radiator below. Fig. 4 is a section on the line 4—4 of Fig. 1, the outer casing being removed. Fig. 5 is a side view partly in section of the cylinder head and manifold shown in Fig. 4. Fig. 6 is a section on the line 6—6 of Fig. 1.

Figs. 7, 8, 9 and 10 are diagrams showing the different positions of the piston and cylinder during one revolution, these figures corresponding to the similar figures in the said Woodward patent.

Figs. 11, 12, and 13 are details of a spring supported frame for the engine.

Figure 15:
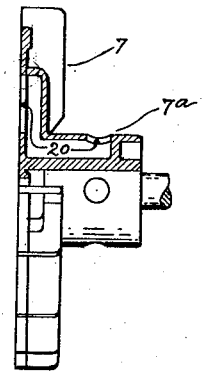
Figure 16:
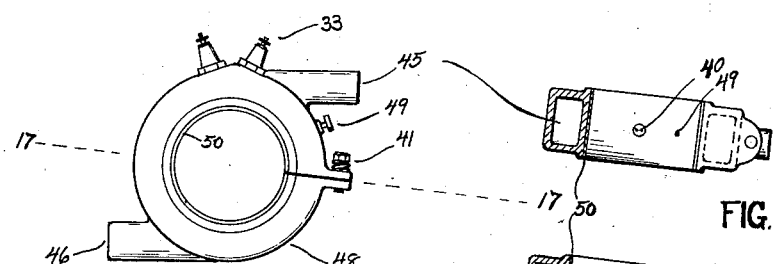
Figure 17:
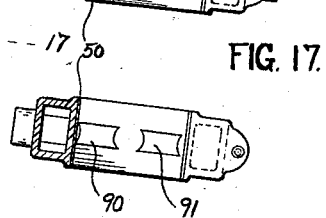
Figure 18:
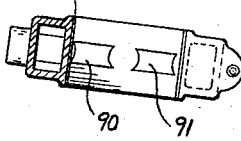

Fig. 14 is an end elevation of the cylinder. Fig. 15 is a partial sectional view of the cylinder head on the line 15—15 of Fig. 14. Fig. 16 is a side elevation of the manifold. Figs. 17 and 18 are opposite sectional views on the line 17—17 of Fig. 16.

Corresponding to said patent, the engine includes a substantial frame 1 having bearings 2 and 2' which support shaft sections 5 and 5' between which is a third shaft section 5" to which is fixed a two blade piston and a wrist plate 16. A cylinder 3 with opposite heads 6 and 7 is fixed to the sections 5 and 5', together with a gear and crankcase 11. Surrounding and forming a bearing support for shaft 5, is a stationary or abutment gear 12 with its sleeve or hub 12a. The gear and crankcase 11 supports and carries cranks 18 with pinions 13 fixed thereto and meshing with stationary gear 12. The cranks 18 are connected to the wrist plate 16 by links 17, causing the wrist plate 16, shaft section 5″, and piston 4 to rotate intermittently while gear case 11, cylinder 3 with heads 6 and 7, and shaft sections 5 and 5′ rotate continuously, as described in said patent. The head 7 is provided with a cylindrical projection or hub 7a containing port pockets 20 communicating thru the ports 29, 30, 31 and 32 with the interior of the cylinder, said ports extending through housings 29a, 30a, 31a and 32a, see Figs. 1 and 14. Surrounding said hub is an annular combined intake and exhaust manifold 48 containing an inlet passage 45 and an exhaust passage 46. See Figs. 4, 5, 6, 16, 17, and 18. The upper half of the inner wall of the manifold is closed except for an inner firing hole 40, and the lower half is open to the pockets thru ports 90 and 91. The revolving pockets or passages 20 in contact with the inner walls of the manifold will hold the compression and expansion while passing over the closed part and will open to the intake and exhaust while passing over the elongated ports 90 and 91, see Figs. 17 and 18.

The cylinder 3 is divided by diametrically opposite partitions or abutments 8 which are fastened to the cylinder, into two compartments the inner wall of which is formed by the hub 25 of the piston, and these two compartments are intersected by the wings of the piston 4, thus producing four compartments closed at their ends by the cylinder heads 6 and 7 and marked A, B, C and D, in each of which a charge will be fired at each revolution of the engine.

As described in the said patent, the general operation of the engine is as follows, referring to Figs. 7 to 10: Assuming that a charge has been compressed and is ready to fire in compartment D with the engine parts in the position as shown in Fig. 7, the compartment C contains an expanded or used charge, the compartment A a fresh charge ready to compress, and compartment B in a position to take a new charge. Ignition of the charge in compartment D will rotate the cylinder 3 to the position shown in Fig. 8, the pinions 13 and cranks 18 being in the position shown in full lines in Fig. 2. The piston 4 forms the abutment on this stroke, by means of the position of the links 15, cranks 18, and pinion 13 engaging stationary gear 12 which prevents reverse movement of the piston. The explosive force against the abutment 8 and the adjacent part of cylinder 3 drives said cylinder approximately one quarter of a revolution, piston 4 remaining stationary. Meanwhile, the gas in compartment A will be compressed and the burned gas in compartment C will be exhausted and a fresh charge will be drawn in compartment B as shown in Fig. 8. At the next ignition in compartment A, the abutment 8 of cylinder 3 forms the abutment and the explosive force rotates the piston 4 a half revolution and cylinder 3 a quarter revolution to the position shown in Fig. 9, links 15, cranks 18 and pinions 13 turning to the dotted line position in Fig. 2. The next explosion occurs in compartment B which forces the cylinder around to the position shown in Fig. 10 with the pinions, cranks and links to the position shown in full lines in Fig. 2. Then the operation is repeated. This is the operation described in the said Woodward patent.

One or more spark plugs 33, see Figs. 4 and 6, provide single or multiple ignition, these spark plugs being set in a recess in the manifold 48 communicating in succession with the passages 20 leading to the compartments at the time each charge is compressed therein. The manifold rides on hub 7a and may be adjusted angularly by lever 34 thru a screw rod 35 having a nut 36, and this will vary the time of ignition, even when a continous spark is used, by the earlier or later connection with the revolving passages 20. Likewise this adjustment may be used to regulate the earlier or later opening of the passages 20 into the intake chamber 45 and the exhaust chamber 46, providing means for adjustment to obtain the highest efficiency possible.

A timing device comprises a commutator 37, fixed on shaft section 5′ and an arm 38 mounted on the manifold 48, said arm supporting a spring brush 39 riding on commutator 37 to make and break the circuit as the commutator rotates with the shaft, and the spark may be advanced or retarded by adjustment of the arm 38 by means of slot 38a and screw therethru, or by adjusting the manifold angularly, or both. It may be noted that the time of ignition cannot be made earlier than the time of communication of a pocket with the spark plug or firing opening 40, which prevents excessive advance. However, the manifold 48 may be turned by the lever 34 and the screw 36 thereby varying the connection with the pockets 20 and at the same time advancing the time of ignition as much as they will permit.

For by-passing or relieving compression, a valve 49 is tapped thru the outer wall of the manifold 48, and opens or closes the hole in the inner wall of the said manifold, said hole being adapted to communicate with the revolving pockets 20. On partially or fully opening the valve 49, the compressed charge will be more or less released into the intake passage 45 from whence it is taken into the following explosion compartment, thereby providing a means of varying the degree of compression and the volume of the charge while the engine is in operation and without loss of fuel. Manifold 48 is split at one side and the split ends are held together by means of a screw and spring 41, thereby providing a means of adjustment as for wear. The spring under the screw head causes a contraction of the manifold 48 against the hub 7a on which it rides. This joint is located at a point on the manifold at which, when the port pockets 20 are adjacent thereto, they have received their charge of gas which has not yet been compressed, thereby the charge in the cylinder compartments and the pockets 20 being near atmospheric pressure will pass over this joint without loss or leakage.

Within the manifold 48 is a circular liner 50, made fast to the circular manifold by pins or other means and having openings conforming to the ports 40, 90, and 91. Said circular liner is also split at the joint 41a of the manifold and consequently partakes of the same adjustment for wear or proper fitting. Said liner provides a convenient means of renewal of the wearing surface of the manifold and also provides a means of utilizing a more suitable bearing material than that of which the manifold may be made itself.

The annular manifold 48 is made hollow, and the inlet passage 45 extends entirely around the same (excepting the wall at the joint) and the exhaust chamber 46 is cored or contained within the inlet passage (as shown in Fig. 5). The spark plug enclosures are also cored or enclosed within said intake passage. Therefore the spark plug casing is cooled by the flow of the intake charge around in the manifold, and said charge is at the same time preheated by the heat of the spark plug chamber as well as of the exhaust passage 46, thereby maintaining a nearly uniform temperature in said manifold as a whole and preventing warping by irregular expansion.

An air casing 10, with a radiator 92 at the bottom thereof, surrounds the revolving cylinder, and said cylinder may have external ribs 3a for better cooling effect. The air casing 10 is supported on frame 1 and has a central circular intake opening 22 at one end and also intake openings 28 at its opposite end (Figs. 4 and 5) which lead between and around the passages 20 in hub 7a, the cylinder ribs providing a fan which draws air thru said openings and forces the same thru the radiator, creating an air current which cools the cylinder and also the passages 20.

The circulation of the cooling fluid to and from the radiator is effected as follows:

The tubes of the radiator for the cooling liquid such as water or oil communicate at one end with a pump 104 operated by a cam 104a on shaft section 5′ and the liquid is piped from the pump to a ring 106 encircling the shaft section 5′ which has an internal bore 107 communicating thru openings 108 with the interior of said ring, and this bore leads to a similar bore 109 in the shaft section 5″ having ports 110 leading thru the hub of piston 4 into the hollow in said piston and thence back thru ports 111 to a bore 112 having ports 113 leading to a ring 105 surrounding the hub of cylinder 3 and discharging into the radiator 92, which has inlet and outlet wells 92a and 92b at opposite ends thereof, these wells being connected by tubes between which the air flows from the fan casing 10.

The frame for supporting the engine is shown in Figs. 1, 3, 6 and 12, especially. At one end this frame 1 is provided with a beam 101 having a hub 101a to which the abutment gear 12 is keyed by means of its sleeve 12a. The sleeve 101 of the said beam is supported and is capable of some turning movement in the end bearing 2 of the frame 1. Coil springs 103 are located between ears 102 and a flange 1a on the main frame 1, so that the beam 101 is capable of a slight yielding, rocking movement of beam 101 and consequently of abutment gear 12 fixed thereto, whereby the gear forms a somewhat resilient abutment for the torque produced by the explosions as they occur, by permitting a slight rocking movement of the gear 12.

The invention is not limited to the particular form shown, but various changes may be made within the scope thereof. Thus the timing devices may be fixed with respect to the shaft, instead of being adjustable by the lever 34, as above explained, having all the features of the adjustable mainfold except that it is stationary.

I claim:

1. The combination with a rotary internal combustion engine having a cylinder adapted to be rotated and provided with an intake port opened and closed by the rotation of the cylinder, of an intake manifold communicating with said port, and a compression relieving valve between said port and the intake manifold in advance of the firing position of the cylinder.

2. The combination with a rotary internal combustion engine cylinder having ports leading thereinto, of a combined annular intake and exhaust manifold having openings communicating with said ports in succession, the exhaust section of the manifold being adjacent the intake section of the manifold for a part of its length, whereby to heat the gases flowing thru the intake section.

3. The combination with a rotary internal combustion engine cylinder adapted in its rotation to assume inlet, compression, firing and exhaust positions, and also having a series of ports leading into the same, of a combined annular inlet and exhaust manifold having openings adapted to communicate in succession with said ports and also having a spark plug chamber communicating with said ports in succession as they reach the firing position.

4. The combination stated in claim 3, the manifold being adjustable angularly to vary the time of ignition, and a timer having a brush mounted on the manifold and in circuit with the spark plug and adjustable relative to the manifold to vary the timing.

5. In an internal combustion engine, the combination with a rotary cylinder having a hub provided with ports therein, of a combined annular intake and exhaust manifold surrounding the hub and having inlet and exhaust openings communicating successively with said ports, said intake manifold also having a compression relieving valve communicating with said ports in succession whereby compression in the cylinder may be relieved.

6. The combination with a rotary internal combustion engine cylinder having a hub with peripheral ports therein communicating with the cylinder, of a combined intake and exhaust manifold surrounding said hub and having openings communicating with said ports successively, and a spark plug chamber mounted on the manifold and also communicating with said ports successively.

7. The combination stated in claim 6, the manifold and spark plug chamber being adjustable angularly around the hub, for the purpose stated.

8. The combination with a rotary cylinder having a cylindrical hub provided with ports, of an annular intake and exhaust manifold having an inlet and an exhaust port communicating with said ports in said hub, said ports in the hub leading to explosive chambers within the rotating cylinder, and a spark plug housing extending thru the intake passage and exposed to said ports in the hub, said intake passage surrounding said spark plug housings.

9. The combination with a rotary internal combustion engine cylinder, of an annular intake and exhaust manifold having an inlet and an exhaust port adapted to communicate with revolving ports leading into the rotating cylinder, and an adjustable joint in said manifold.

10. The combination with a rotary internal combustion engine cylinder, of an annular intake and exhaust manifold having an inlet and an exhaust port adapted to communicate with revolving ports leading into the rotating cylinder, and an air cooled hub integral with said cylinder and supporting said manifold.

11. The combination with a rotary cylinder, of an annular intake and exhaust manifold having an inlet and an exhaust port communicating with revolving ports leading into said cylinder, and a hub integral with said cylinder and partially supporting said manifold, and said ports opening outwardly in said hub, in contact with and sealed by the inner wall of said manifold.

In testimony whereof, I do affix my signature.

LOUIS SWENINGSON.